US012793698B2

(12) United States Patent
Strassenburg-Kleciak et al.

(10) Patent No.: US 12,793,698 B2
(45) Date of Patent: Nov. 10, 2026

(54) VOICE COMMUNICATION BETWEEN A SPEAKER AND A RECIPIENT OVER A COMMUNICATION NETWORK

(71) Applicant: Elektrobit Automotive GmbH, Erlangen (DE)

(72) Inventors: Marek Strassenburg-Kleciak, Erlangen (DE); Prashanth Ram Kurumbudel, Sullia (IN)

(73) Assignee: Elektrobit Automotive GmbH, Erlangen (DE)

(*) Notice: Subject to any disclaimer, the term of this patent is extended or adjusted under 35 U.S.C. 154(b) by 384 days.

(21) Appl. No.: 17/837,684

(22) Filed: Jun. 10, 2022

(65) Prior Publication Data

US 2023/0005465 A1 Jan. 5, 2023

(30) Foreign Application Priority Data

Jun. 30, 2021 (EP) .................................... 21182638

(51) Int. Cl.

| | |
|---|---|
| ***G10L 13/047*** | (2013.01) |
| ***G10L 13/033*** | (2013.01) |
| ***G10L 13/06*** | (2013.01) |
| ***G10L 15/22*** | (2006.01) |
| ***G10L 15/26*** | (2006.01) |
| ***H04L 47/12*** | (2022.01) |

(52) U.S. Cl.

CPC .......... *G10L 13/047* (2013.01); *G10L 13/033* (2013.01); *G10L 13/06* (2013.01); *G10L 15/22* (2013.01); *G10L 15/26* (2013.01); *H04L 47/12* (2013.01)

(58) Field of Classification Search

CPC ..... G10L 13/00; G10L 13/027; G10L 13/033; G10L 13/047; G10L 13/06; G10L 15/22; G10L 15/26; H04L 47/12

See application file for complete search history.

(56) References Cited

U.S. PATENT DOCUMENTS 6,490,550 B1 * 12/2002 Hiri .................... G10L 19/0018 704/235
7,069,014 B1 * 6/2006 Thenthiruperai ... H04L 65/1101 709/227

(Continued)

FOREIGN PATENT DOCUMENTS

EP 2224426 A1 9/2010

OTHER PUBLICATIONS

Search Report dated Dec. 16, 2021 from corresponding European patent application No. 21182638.3.

*Primary Examiner* — Angela A Armstrong

(57) ABSTRACT

Voice communication, between a speaker and a recipient, either or both of which may be in a motor vehicle, is provided via a communication network. In a first step, an input speech utterance is received from the speaker. Optionally, a bandwidth of a connection to the communication network is evaluated at the side of the speaker. The input speech utterance is then converted to text. At least the text is transmitted over the communication network. In case of a sufficiently large bandwidth, the input speech utterance may be transmitted as voice and as text. The transmitted text is converted into an output speech utterance that simulates a voice of the speaker. Finally, the output speech utterance is provided to the recipient.

24 Claims, 6 Drawing Sheets

(56) References Cited

U.S. PATENT DOCUMENTS

| | | | | |
|---|---|---|---|---|
| 7,117,152 | B1 * | 10/2006 | Mukherji | G10L 19/0018 704/235 |
| 2008/0235024 | A1 * | 9/2008 | Goldberg | G10L 13/00 704/260 |
| 2009/0326939 | A1 * | 12/2009 | Toner | H04M 3/42391 704/235 |
| 2018/0218727 | A1 * | 8/2018 | Cutler | H04L 65/752 |
| 2020/0058290 | A1 * | 2/2020 | Chae | G10L 15/16 |
| 2021/0183392 | A1 | 6/2021 | Lee et al. | |

* cited by examiner

VOICE COMMUNICATION BETWEEN A SPEAKER AND A RECIPIENT OVER A COMMUNICATION NETWORK

BACKGROUND

The present invention is related to a method, a computer program, and a system for voice communication between a speaker and a recipient over a communication network. The invention is further related to apparatuses for use of such a system and a vehicle comprising such apparatuses.

With the broad availability of broadband Internet access, voice communication has shifted to IP telephony solutions, also known as Voice over Internet Protocol (VoIP). VoIP refers to technologies for the delivery of voice communications over Internet Protocol (IP) networks. While these technologies in general deliver a satisfactory service, sometimes people are difficult to understand during a voice call. A main reason is a low bandwidth or data rate of the connection. If the achievable data rate is too low, the connection is still available, but the quality of conversation is unsatisfactory.

It is an object of the present invention to provide a solution for voice communication between a speaker and a recipient over a communication network, which delivers an improved quality of communication.

BRIEF SUMMARY

This object is achieved by a method, a computer program, which implements this method, a system, and apparatuses according to the independent claims. The dependent claims include advantageous further developments and improvements of the present principles as described below.

According to a first aspect, a method for voice communication between a speaker and a recipient over a communication network comprises the steps of:

- receiving an input speech utterance from the speaker;
- converting the input speech utterance to text;
- transmitting at least the text over the communication network;
- converting the transmitted text into an output speech utterance that simulates a voice of the speaker; and
- providing the output speech utterance to the recipient.

Accordingly, a computer program comprises instructions, which, when executed by at least one processor, cause the at least one processor to perform the following steps for voice communication between a speaker and a recipient over a communication network:

- receiving an input speech utterance from the speaker;
- converting the input speech utterance to text;
- transmitting at least the text over the communication network;
- converting the transmitted text into an output speech utterance that simulates a voice of the speaker; and
- providing the output speech utterance to the recipient.

The term computer has to be understood broadly. In particular, it also includes workstations, distributed systems, and other processor-based or microcontroller-based data processing devices.

The computer program can, for example, be made available for electronic retrieval or stored on a computer-readable storage medium. Amongst others, the computer program can be provided as an app for mobile devices.

According to another aspect, a system for voice communication between a speaker and a recipient over a communication network comprises:

- an input module configured to receive an input speech utterance from the speaker;
- a speech-to-text conversion module configured to convert the input speech utterance to text;
- a transmission module configured to transmit at least the text over the communication network;
- a text-to-speech conversion module configured to convert the transmitted text into an output speech utterance that simulates a voice of the speaker; and
- an output module configured to provide the output speech utterance to the recipient.

According to another aspect, an apparatus for use in a system according to the invention comprises:

- an input module configured to receive an input speech utterance from the speaker;
- a speech-to-text conversion module configured to convert the input speech utterance to text; and
- a transmission module configured to transmit at least the text over the communication network.

According to another aspect, an apparatus for use in a system according to the invention comprises:

- a receiving module configured to receive text generated from an input speech utterance of a speaker;
- a text-to-speech conversion module configured to convert the transmitted text into an output speech utterance that simulates a voice of the speaker; and
- an output module configured to provide the output speech utterance to the recipient.

According to embodiments of the invention, the speech input of a speaker is converted into text by a speech-to-text conversion module and transmitted as text to the recipient, preferably together with additional information about the speech utterance. This additional information may include, for example, an intonation (e.g., ascending or descending), a speed of speech, detected emotions (e.g., excited, nervous, etc.), durations of the individual words, etc. At the side of the recipient, the received text and, if applicable, the additional information are then converted into a speech output by a text-to-speech conversion module. Speech-to-text and text-to-speech conversion modules are state of the art. This conversion of the received text is done in such way that the speech output resembles the voice of the speaker. Even though the voice of the speaker is synthesized, the recipient will have the feeling of listening to the speaker's voice. As the transmission of text has less requirements with regard to the connection to the communication network than the transmission of voice, a seamless voice call experience is achieved even in fluctuating network conditions. As a further advantage, the described solution allows removing noise stemming from the side of the speaker.

In an advantageous embodiment, a bandwidth of a connection to the communication network is evaluated at the side of the speaker. In this way, the conversion of the speech input of the speaker into text can be omitted if the connection to the communication network is good enough for transmitting voice.

In an advantageous embodiment, in case of a sufficiently large bandwidth, the input speech utterance is transmitted as voice and as text. In this way, depending on the data connection at the side of the recipient, the received text can be discarded or used for generating the speech output.

In an advantageous embodiment, the transmitted text is converted into an output speech utterance by a text-to-speech algorithm. Text-to-speech algorithms are well established and have rather limited requirements with regard to the necessary processing power. Preferably, the text-to-speech algorithm uses a phoneme library suitable for simulating different speakers. In this way, by an appropriate choice of the phonemes the voice of the speaker can easily be simulated.

In an advantageous embodiment, the transmitted text is converted into an output speech utterance by one or more trained artificial intelligence models. While trained artificial intelligence models typically require more processing power than text-to-speech algorithms, they will yield more natural speech outputs.

In an advantageous embodiment, a first trained artificial intelligence model transforms the transmitted text into an intermediate speech utterance and a second trained artificial intelligence model transforms the intermediate speech utterance into the output speech utterance. In this way, the first trained artificial intelligence model converts the input data into another space and is broadly usable irrespective of a specific speaker. The second artificial intelligence model manipulates the data in the same space. Preferably, the second artificial intelligence model is trained with the voice of the individual specific speaker. In addition to the first artificial intelligence model and the second artificial intelligence model, a further artificial intelligence model may be provided, which is responsible for synthesizing the tone or emotion of the speaker. This further artificial intelligence model may make use of the additional information that is sent along with the text.

In an advantageous embodiment, the second trained artificial intelligence model is selected from a bank of trained artificial intelligence models. The artificial intelligence models inside the bank are individual models trained with individual user voices. This allows simulating the voices of different speakers.

In an advantageous embodiment, the second trained artificial intelligence model is selected from the bank of trained artificial intelligence models based on information about the speaker. In this way, an artificial intelligence model that is appropriate for simulating the voice of a specific speaker can easily be determined.

In an advantageous embodiment, the information about the speaker is provided by the speaker or determined by a voice analysis algorithm. The information provided by the speaker may, for example, be a unique identifier, which is associated with an artificial intelligence model of the bank. Alternatively, the voice analysis algorithm may provide characteristics of the voice of the speaker. These characteristics may then be used for determining an artificial intelligence model in the bank that generates similar characteristics.

Preferably, a vehicle comprises apparatuses for use in a system according to the invention. In this way, an improved quality of voice communication is achieved even in situations or locations with low connectivity. However, the described solutions are applicable to any VoIP system.

Further features of the present invention will become apparent from the following description and the appended claims in conjunction with the figures.

DETAILED DESCRIPTION

Figure 1:
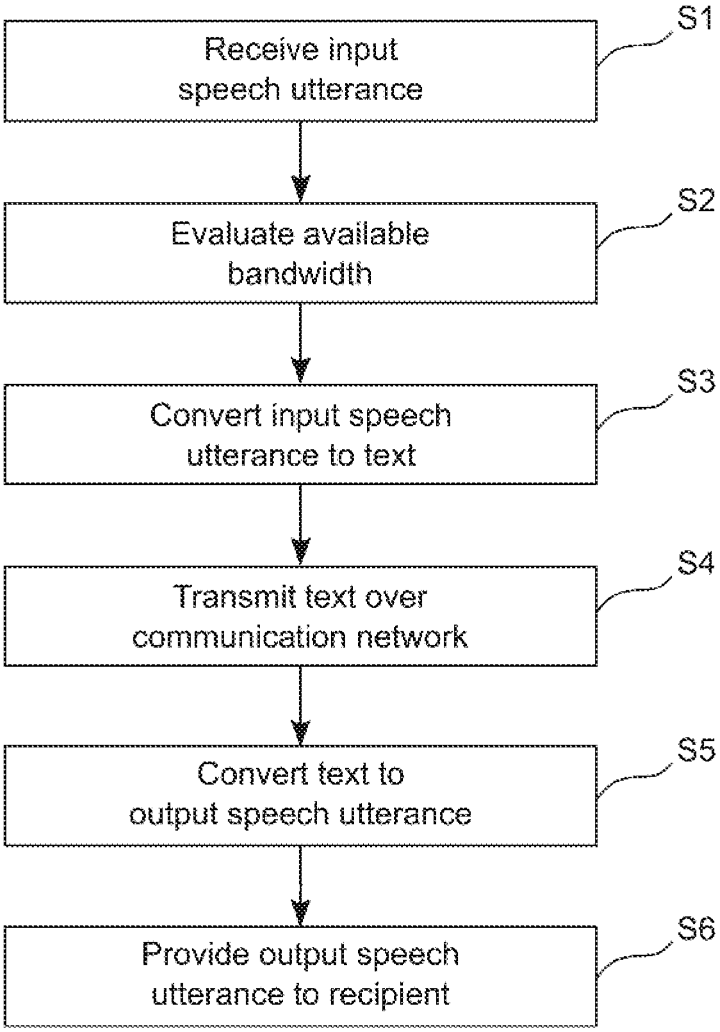
FIG. 1 schematically illustrates a method for voice communication between a speaker and a recipient over a communication network.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method according to the invention for voice communication between a speaker and a recipient over a communication network. In a first step, an input speech utterance is received S1 from the speaker. Optionally, a bandwidth of a connection to the communication network is evaluated S2 at the side of the speaker. The input speech utterance is then converted S3 to text. At least the text is transmitted S4 over the communication network. In case of a sufficiently large bandwidth, the input speech utterance may be transmitted S4 as voice and as text. The transmitted text is converted S5 into an output speech utterance that simulates a voice of the speaker. For this purpose, a text-to-speech algorithm may be used. Preferably, such a text-to-speech algorithm uses a phoneme library suitable for simulating different speakers. Alternatively, the transmitted text is converted S5 into an output speech utterance by one or more trained artificial intelligence models. For example, a first trained artificial intelligence model may transform the transmitted text into an intermediate speech utterance. A second trained artificial intelligence model then transforms the intermediate speech utterance into the output speech utterance. The second trained artificial intelligence model may be selected from a bank of trained artificial intelligence models, e.g. based on information about the speaker. Such information may be provided by the speaker or determined by a voice analysis algorithm. Finally, the output speech utterance is provided S6 to the recipient.

Figure 2:
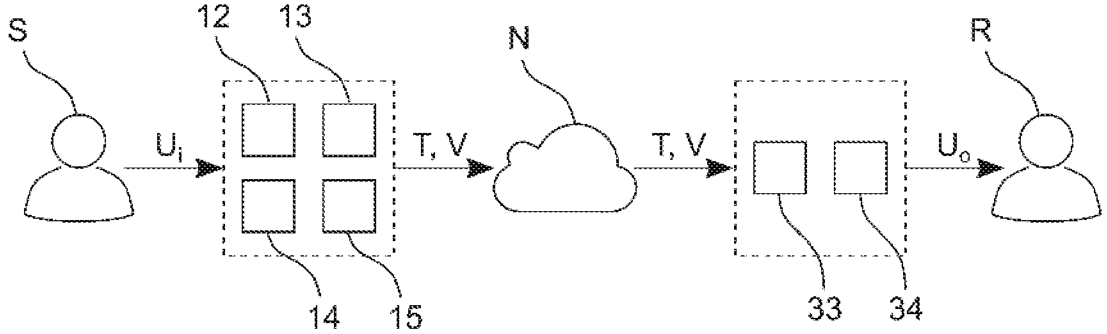
FIG. 2 schematically illustrates a system for voice communication between a speaker and a recipient over a communication network.

FIG. 2 schematically illustrates a block diagram of a system for voice communication between a speaker S and a recipient R over a communication network N. The system comprises an input module 12 configured to receive an input speech utterance $U_i$ from the speaker S. An evaluation module 13 may be provided at the side of the speaker for evaluating a bandwidth of a connection to the communication network N. A speech-to-text conversion module 14 is configured to convert the input speech utterance $U_i$ to text T. A transmission module 15 is configured to transmit at least the text T over the communication network N, preferably together with additional information about the speech utterance. In case of a sufficiently large bandwidth, the input speech utterance $U_i$ may be transmitted by the transmission module 15 as voice V and as text T. A text-to-speech conversion module 33 is configured to convert the transmitted text T into an output speech utterance $U_o$ that simulates a voice of the speaker S. For this purpose, the text-to-speech conversion module 33 may use a text-to-speech algorithm. Preferably, such a text-to-speech algorithm uses a phoneme library suitable for simulating different speakers. Alternatively, the text-to-speech conversion module 33 may convert the transmitted text into the output speech utterance $U_o$ using one or more trained artificial intelligence models. For example, a first trained artificial intelligence model may transform the transmitted text into an intermediate speech utterance. A second trained artificial intelligence model then transforms the intermediate speech utterance into the output speech utterance. The second trained artificial intelligence model may be selected from a bank of trained artificial intelligence models, e.g. based on information about the speaker S. Such information may be provided by the speaker S or determined by a voice analysis algorithm. An output module 34 is configured to provide the output speech utterance $U_o$ to the recipient R.

Figure 3:
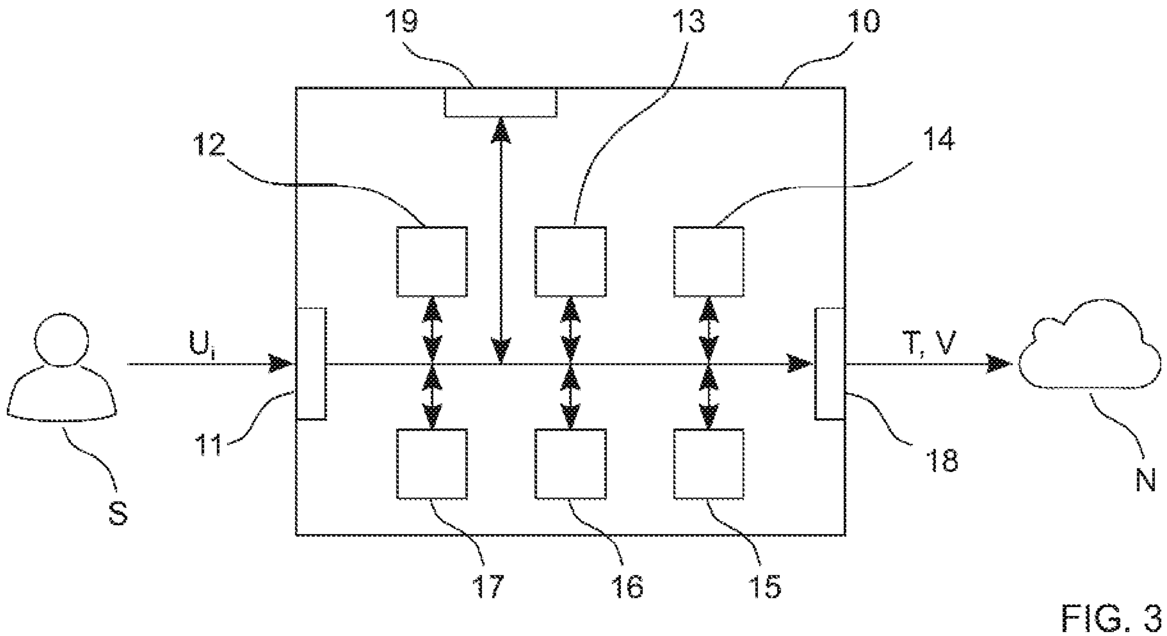
FIG. 3 schematically illustrates a first embodiment of an apparatus for use in the system of FIG. 2 at the side of the speaker.

FIG. 3 schematically illustrates a block diagram of a first embodiment of an apparatus 10 for use in the system of FIG. 2 at the side of the speaker S. The apparatus 10 has an input 11 via which an input module 12 receives an input speech utterance $U_i$ from the speaker S. An evaluation module 13 may be provided for evaluating a bandwidth of a connection to a communication network N. The apparatus 10 further has a speech-to-text conversion module 14 configured to convert the input speech utterance $U_i$ to text T. A transmission module 15 is configured to transmit at least the text T over the communication network N via an output 18, preferably together with additional information about the speech utterance, such as an intonation, a speed of speech, detected emotions, durations of the individual words, etc. In case of a sufficiently large bandwidth, the input speech utterance $U_i$ may be transmitted by the transmission module 15 as voice V and as text T. A local storage unit 17 is provided, e.g. for storing data during processing. The output 18 may also be combined with the input 11 into a single bidirectional interface.

The various modules 12-15 may be controlled by a control module 16. A user interface 19 may be provided for enabling a user to modify settings of the various modules 12-16. The modules 12-16 of the apparatus 10 can be embodied as dedicated hardware units. Of course, they may likewise be fully or partially combined into a single unit or implemented as software running on a processor, e.g. a CPU or a GPU.

Figure 4:
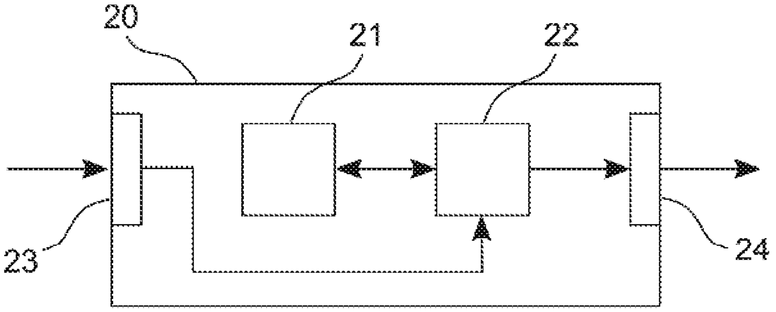
FIG. 4 schematically illustrates a second embodiment of an apparatus for use in the system of FIG. 2 at the side of the speaker.

A block diagram of a second embodiment of an apparatus 20 according to the invention for use in the system of FIG. 2 at the side of the speaker is illustrated in FIG. 4. The apparatus 20 comprises a processing device 22 and a memory device 21. For example, the apparatus 20 may be a computer, an embedded system, or part of a distributed system. The memory device 21 has stored instructions that, when executed by the processing device 22, cause the apparatus 20 to perform steps according to one of the described methods. The instructions stored in the memory device 21 thus tangibly embody a program of instructions executable by the processing device 22 to perform program steps as described herein according to the present principles. The apparatus 20 has an input 23 for receiving data. Data generated by the processing device 22 are made available via an output 24. In addition, such data may be stored in the memory device 21. The input 23 and the output 24 may be combined into a single bidirectional interface.

The processing device 22 as used herein may include one or more processing units, such as microprocessors, digital signal processors, or a combination thereof.

The local storage unit 17 and the memory device 21 may include volatile and/or non-volatile memory regions and storage devices such as hard disk drives, optical drives, and/or solid-state memories.

Figure 5:
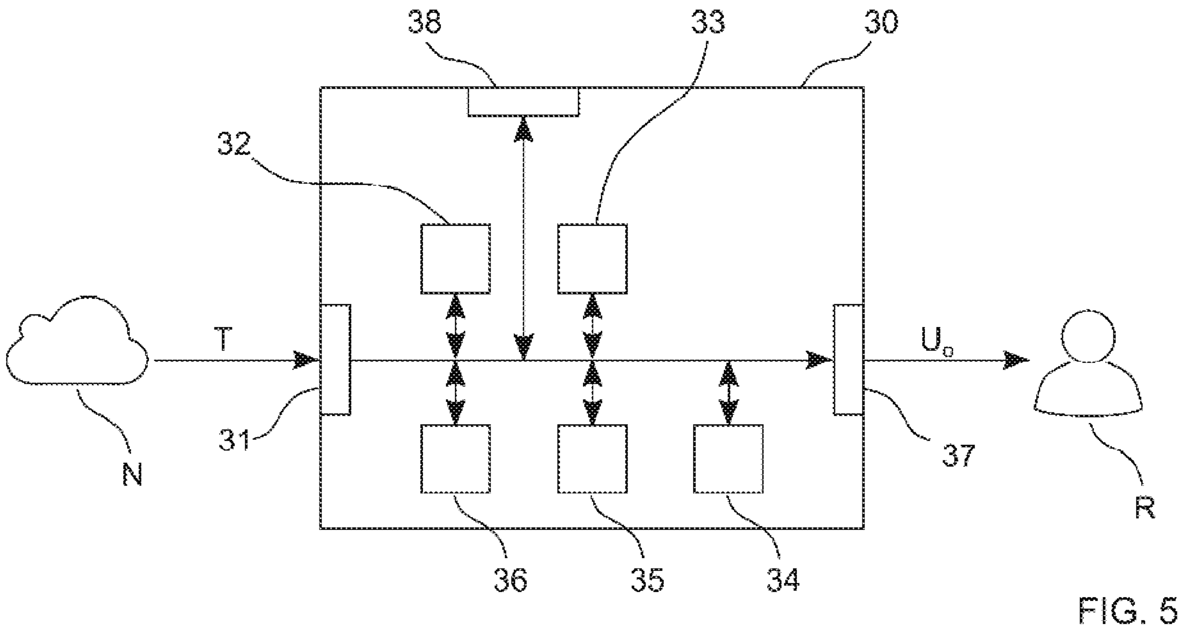
FIG. 5 schematically illustrates a first embodiment of an apparatus for use in the system of FIG. 2 at the side of the recipient.

FIG. 5 schematically illustrates a block diagram of a first embodiment of an apparatus 30 for use in the system of FIG. 2 at the side of the recipient R. The apparatus 30 has an input 31 via which a receiving module 32 receives text T generated from an input speech utterance of a speaker. A text-to-speech conversion module 33 is configured to convert the transmitted text T into an output speech utterance $U_o$ that simulates a voice of the speaker. For this purpose, the text-to-speech conversion module 33 may use a text-to-speech algorithm. Preferably, such a text-to-speech algorithm uses a phoneme library suitable for simulating different speakers. Alternatively, the text-to-speech conversion module 33 may convert the transmitted text into an output speech utterance using one or more trained artificial intelligence models. For example, a first trained artificial intelligence model may transform the transmitted text into an intermediate speech utterance. A second trained artificial intelligence model then transforms the intermediate speech utterance into the output speech utterance. The second trained artificial intelligence model may be selected from a bank of trained artificial intelligence models, e.g. based on information about the speaker. Such information may be provided by the speaker or determined by a voice analysis algorithm. An output module 34 is configured to provide the output speech utterance $U_o$ to the recipient R via an output 37. A local storage unit 36 is provided, e.g. for storing data during processing. The output 37 may also be combined with the input 31 into a single bidirectional interface.

The various modules 32-34 may be controlled by a control module 35. A user interface 38 may be provided for enabling a user to modify settings of the various modules 32-35. The modules 32-35 of the apparatus 30 can be embodied as dedicated hardware units. Of course, they may likewise be fully or partially combined into a single unit or implemented as software running on a processor, e.g. a CPU or a GPU.

Figure 6:
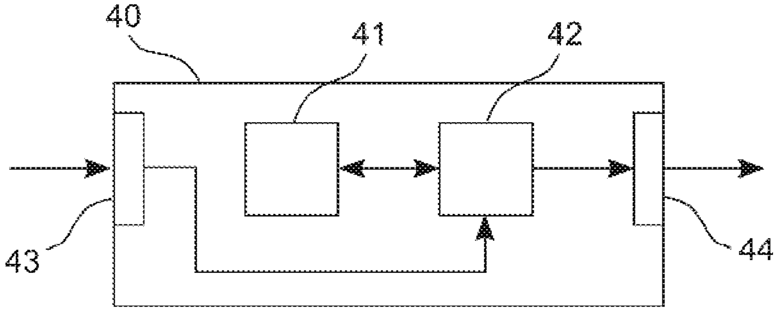
FIG. 6 schematically illustrates a second embodiment of an apparatus for use in the system of FIG. 2 at the side of the recipient.

A block diagram of a second embodiment of an apparatus 40 according to the invention for use in the system of FIG. 2 at the side of the recipient is illustrated in FIG. 6. The apparatus 40 comprises a processing device 42 and a memory device 41. For example, the apparatus 40 may be a computer, an embedded system, or part of a distributed system. The memory device 41 has stored instructions that, when executed by the processing device 42, cause the apparatus 40 to perform steps according to one of the described methods. The instructions stored in the memory device 41 thus tangibly embody a program of instructions executable by the processing device 42 to perform program steps as described herein according to the present principles. The apparatus 40 has an input 43 for receiving data. Data generated by the processing device 42 are made available via an output 44. In addition, such data may be stored in the memory device 41. The input 43 and the output 44 may be combined into a single bidirectional interface.

The processing device 42 as used herein may include one or more processing units, such as microprocessors, digital signal processors, or a combination thereof.

The local storage unit 36 and the memory device 41 may include volatile and/or non-volatile memory regions and storage devices such as hard disk drives, optical drives, and/or solid-state memories.

Figure 7:
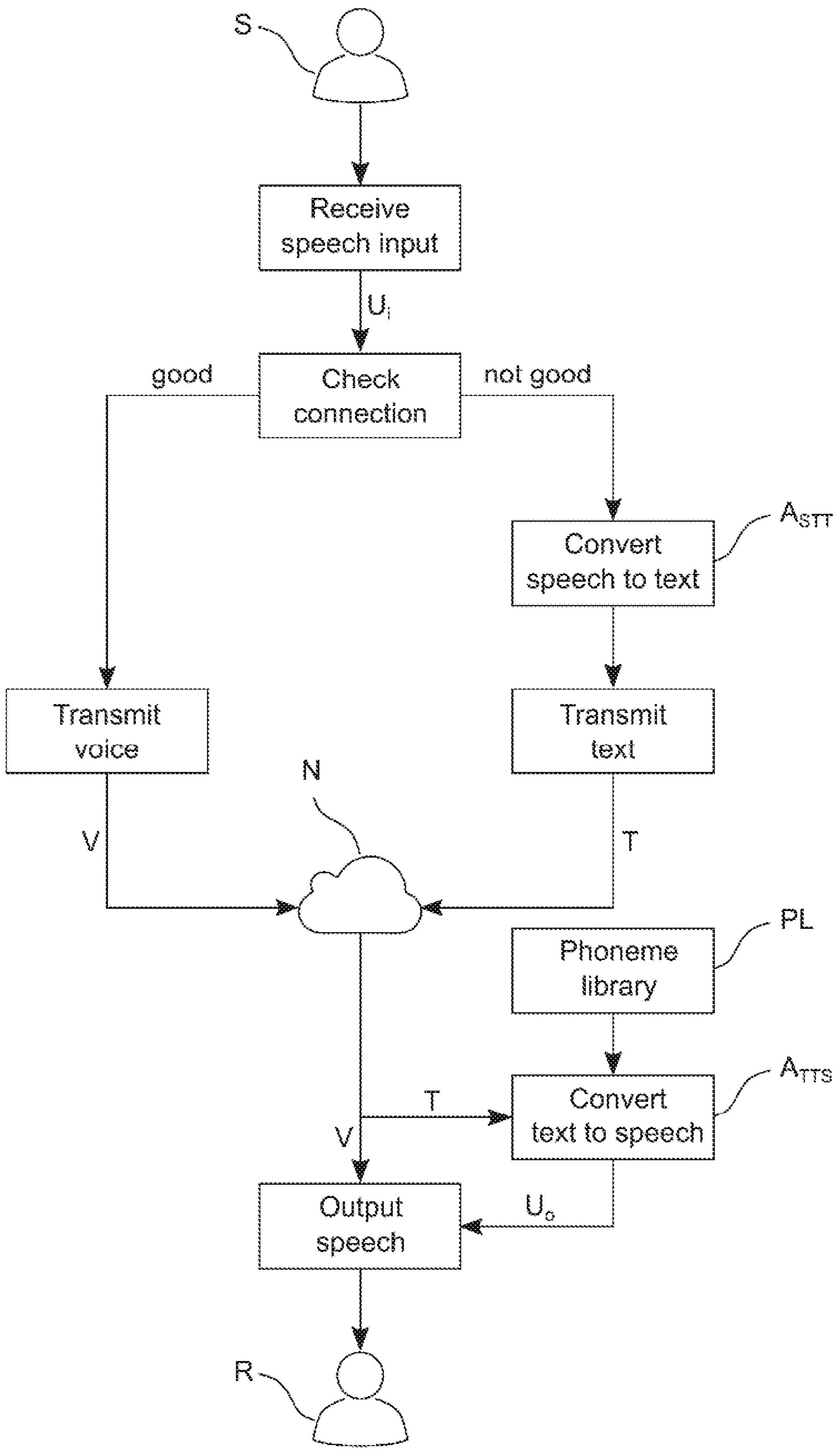
FIG. 7 depicts a system diagram of a first embodiment of a solution according to the invention.

FIG. 7 depicts a system diagram of a first embodiment of a solution according to the invention. When the speaker S speaks, i.e. when an input speech utterance $U_i$ of the speaker S is received, a data connection of a VoIP device at the side of the speaker S is checked. In particular, the bandwidth or available data rate may be determined. If the connection is not good enough for transporting voice signals, the input speech utterance $U_i$ of the speaker S is converted to text T using a speech-to-text algorithm ASTT. The text T is transmitted over the communication network N. The received text T is then converted to voice with the help of a text-to-speech algorithm ATTS. The resulting output speech utterance $U_o$ is provided to the recipient R. For closely resembling the voice of the Speaker S, the text-to-speech algorithm ATTS makes use of a large phoneme library PL. As a result, even in case of a bad connection the recipient R will hear an output speech utterance $U_o$ that at least closely resembles the voice of the speaker S. The phoneme library PL may be located in the hardware used by the recipient R or in a cloud solution.

If the connection at the side of the speaker S is good enough for voice transmission, the voice V is transmitted over the communication network N as VoIP. In this case, the input speech utterance $U_i$ may optionally still be converted to text T and transmitted in addition to the voice V. Depending on the data connection at the side of the recipient R, the system can make use of the received text T or discard it.

Figure 8:
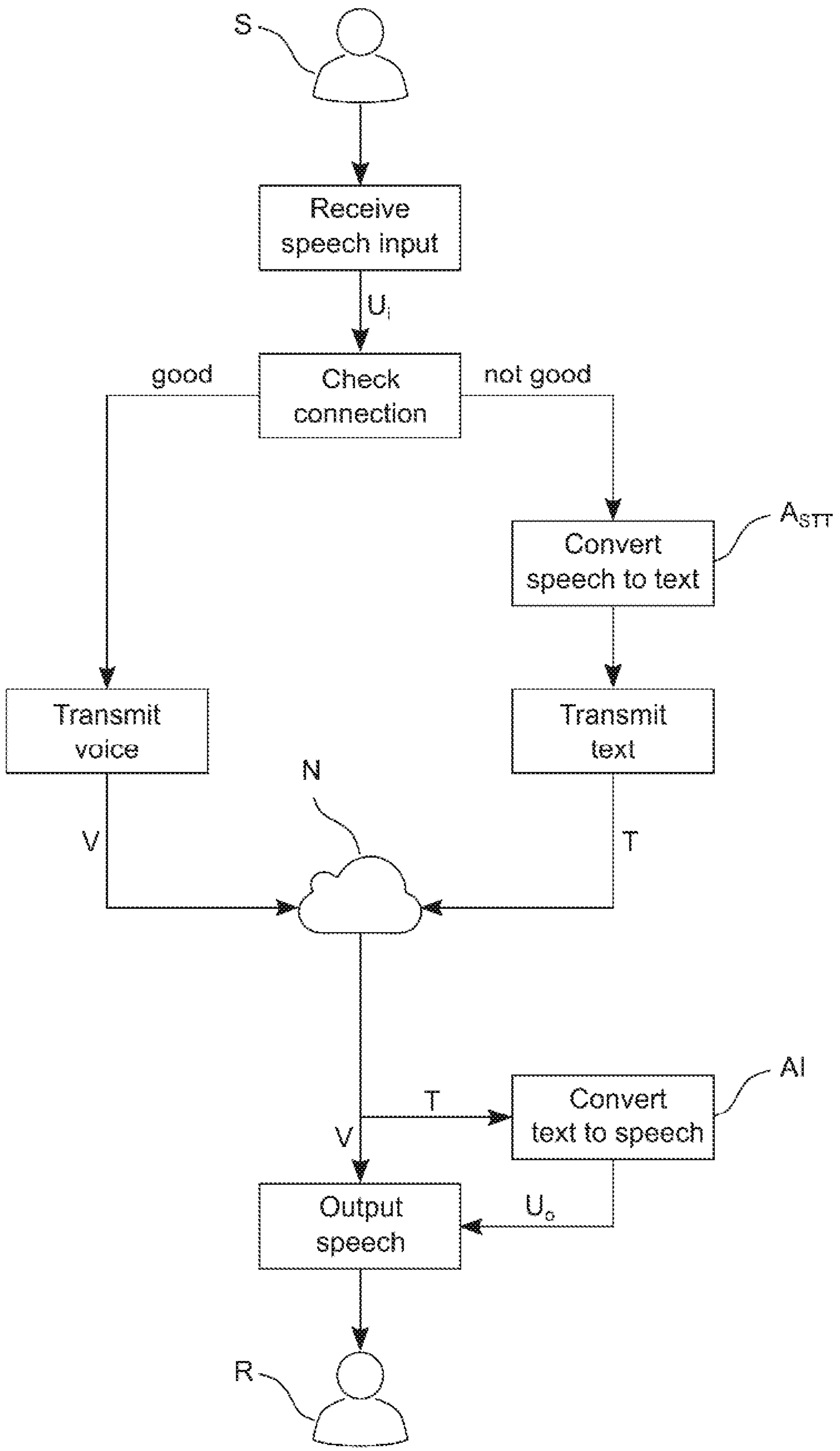
FIG. 8 depicts a system diagram of a second embodiment of a solution according to the invention.
Figure 9:
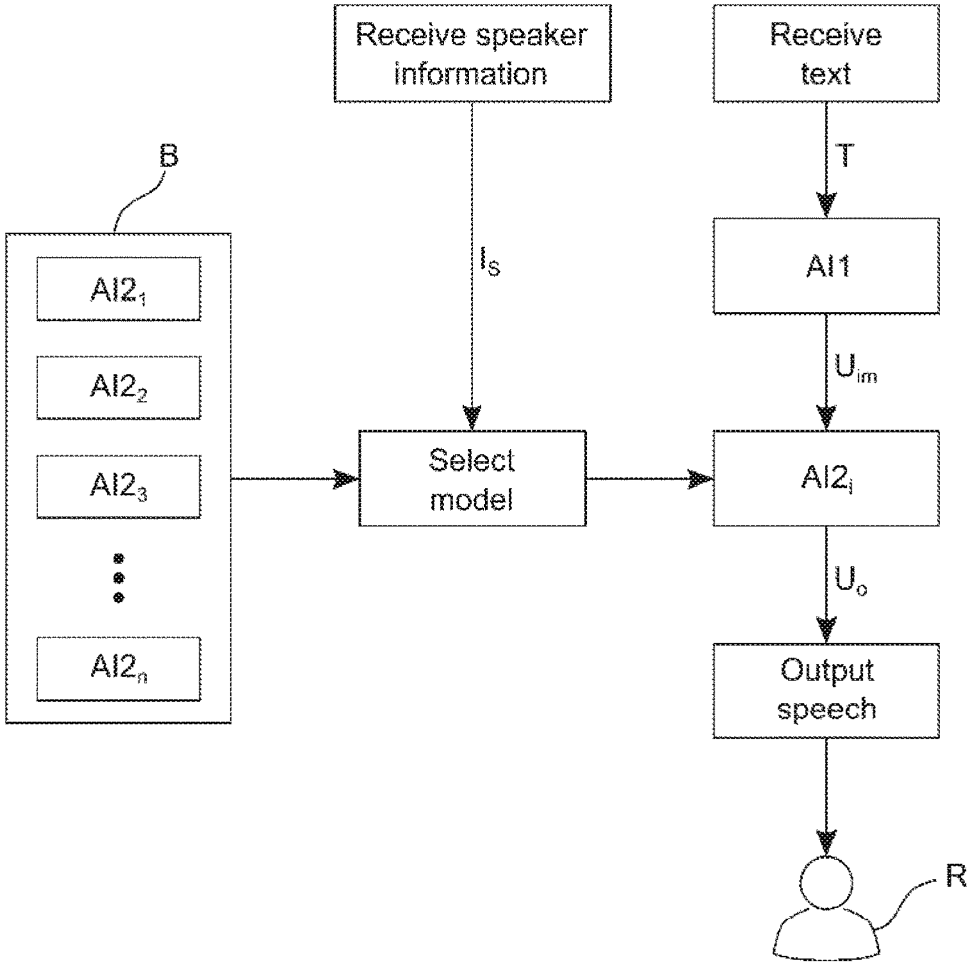
FIG. 9 shows details of a conversion from text to speech with trained artificial intelligence models.

FIG. 8 depicts a system diagram of a second embodiment of a solution according to the invention. The solution is largely identical to the solution of FIG. 1. However, in this case, the conversion of the text T into an output speech utterance $U_o$ is made using one or more trained artificial intelligence models AI. Details of the conversion from text T to speech are shown in FIG. 9. The arrangement of the artificial intelligence models AI1, AI2$_i$ in the figure constitutes a multimodal network. For any conversion from text to speech, processing is done by two artificial intelligence models. A first artificial intelligence model AI1 converts the text T into an intermediate speech utterance $U_{im}$ in a digital format. The intermediate speech utterance $U_{im}$ is then provided to a second artificial intelligence model AI2$_i$, which is selected from a bank B of trained artificial intelligence models AI2$_i$. The artificial intelligence models AI2$_i$ inside the bank B are individual models AI2$_i$ trained with individual user voices. For the selection of a suitable artificial intelligence model AI2$_i$, information IS about the speaker is used. This information IS may, for example, be provided by the speaker or determined automatically using a voice analysis algorithm. The selected artificial intelligence model AI2$_i$ manipulates the intermediate speech utterance $U_{im}$ created by the first artificial intelligence model AI1 into another format in such a way that the resulting output speech utterance $U_o$ closely resembles the voice of the speaker. In other words, the first artificial intelligence model AI1 converts the input data into another space, whereas the second artificial intelligence model AI2$_i$ manipulates the data in the same space. In addition to the first artificial intelligence model AI1 and the second artificial intelligence model AI2$_i$, a further artificial intelligence model (not shown) may be provided, which is responsible for synthesizing the tone or emotion of the speaker. This further artificial intelligence model may make use of tags that are sent along with the text. In this case, the speech-to-text algorithm on the sending side advantageously provides additional information about the speech utterance, such as an intonation, a speed of speech, detected emotions, durations of the individual words, etc.

Figure 10:
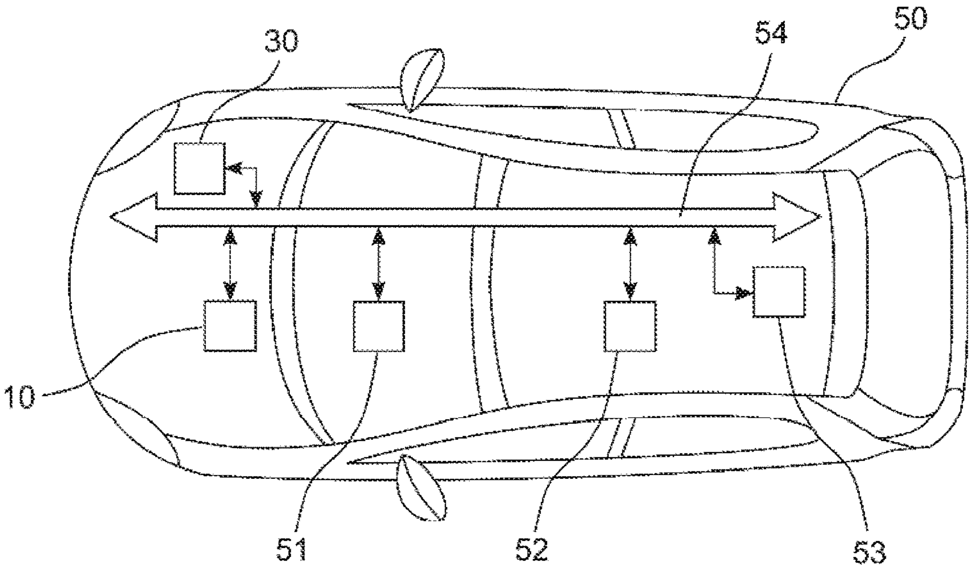
FIG. 10 schematically illustrates a motor vehicle in which a solution according to the invention is implemented.

FIG. 10 schematically shows a motor vehicle 50, in which a solution in accordance with the invention is implemented. The motor vehicle 50 has an infotainment system 51, which is able to establish a VoIP voice communication via a communication network. For this purpose, a data transmission unit 52 is provided. The motor vehicle 50 further has apparatuses 10, 30 according to the invention, which are used for an improved voice communication. The apparatuses 10, 30 may be provided as dedicated hardware units or included in the infotainment system 51. A memory 53 is available for storing data. The data exchange between the different components of the motor vehicle 50 takes place via a network 54.

The invention claimed is:

1. A method for voice communication between a speaker and a recipient over a communication network, the method comprising:

receiving an input speech utterance from the speaker;

evaluating a bandwidth of a connection to the communication network at the side of the speaker;

converting the input speech utterance to text and deriving one or more tags representing one or more characteristics of the input speech utterance, including at least one of intonation, speed of speech, detected emotion, and duration of individual words, if the bandwidth is insufficient for transporting voice signals;

transmitting at least the text and the one or more tags over the communication network and, if the connection has a sufficient bandwidth, transmitting the input speech utterance as voice in addition to the text and tags;

converting the transmitted text using the one or more tags into an output speech utterance that simulates a voice of the speaker; and providing the output speech utterance to the recipient;

wherein the transmitted text is converted into the output speech utterance by one or more trained artificial intelligence models; and wherein a first trained artificial intelligence model transforms the transmitted text into an intermediate speech utterance in a speaker-independent latent feature space and a second trained artificial intelligence model trained using voice data of the speaker and operating in the same latent feature space transforms the intermediate speech utterance into the output speech utterance.

2. The method according to claim 1, wherein the input speech utterance is transmitted as voice and as text if the connection has a sufficient bandwidth.

3. The method according to claim 2, wherein the transmitted text is converted into the output speech utterance by a text-to-speech algorithm.

4. The method according to claim 3, wherein the text-to-speech algorithm uses a phoneme library suitable for simulating different speakers.

5. The method according to claim 1, wherein the second trained artificial intelligence model is selected from a bank of trained artificial intelligence models.

6. The method according to claim 5, wherein the second trained artificial intelligence model is selected from the bank of trained artificial intelligence models based on information about the speaker.

7. The method according to claim 6, wherein the information about the speaker is provided by the speaker or determined by a voice analysis algorithm.

8. The method according to claim 7, wherein a third artificial intelligence model synthesizes an emotion of the speaker based on tags that are received along with the transmitted text, wherein the tags specify a characteristic of the input speech utterance, including at least one characteristic of a group of characteristics, the group of characteristics including: an intonation, a speed of speech, one or more detected emotions, and a respective duration of each individual word of the input speech utterance.

9. A non-transitory computer-readable medium having stored thereon computer-executable instructions, which, when executed by at least one processor, cause the at least one processor to provide voice communication between a speaker and a recipient over a communication network by performing operations comprising:

receiving an input speech utterance from the speaker;

evaluating a bandwidth of a connection to the communication network at the side of the speaker;

converting the input speech utterance to text and deriving one or more tags representing one or more characteristics of the input speech utterance, including at least one of intonation, speed of speech, detected emotion, and duration of individual words, if the bandwidth is insufficient for transporting voice signals;

transmitting at least the text and the one or more tags over the communication network and, if the connection has a sufficient bandwidth, transmitting the input speech utterance as voice in addition to the text and tags;

converting the transmitted text using the one or more tags into an output speech utterance that simulates a voice of the speaker; and providing the output speech utterance to the recipient;

wherein the transmitted text is converted into the output speech utterance by one or more trained artificial intelligence models; and wherein a first trained artificial intelligence model transforms the transmitted text into an intermediate speech utterance in a speaker-independent latent feature space and a second trained artificial intelligence model trained using voice data of the speaker and operating in the same latent feature space transforms the intermediate speech utterance into the output speech utterance.

10. The non-transitory computer-readable medium according to claim 9, wherein the input speech utterance is transmitted as voice and as text if the connection has a sufficient bandwidth.

11. The non-transitory computer-readable medium according to claim 10, wherein the transmitted text is converted into the output speech utterance by a text-to-speech algorithm.

12. The non-transitory computer-readable medium according to claim 11, wherein the text-to-speech algorithm uses a phoneme library suitable for simulating different speakers.

13. The non-transitory computer-readable medium according to claim 9, wherein the second trained artificial intelligence model is selected from a bank of trained artificial intelligence models.

14. The non-transitory computer-readable medium according to claim 13, wherein the second trained artificial intelligence model is selected from the bank of trained artificial intelligence models based on information about the speaker.

15. The non-transitory computer-readable medium according to claim 14, wherein the information about the speaker is provided by the speaker or determined by a voice analysis algorithm.

16. The non-transitory computer-readable medium according to claim 15, wherein a third artificial intelligence model synthesizes an emotion of the speaker based on tags that are received along with the transmitted text, wherein the tags specify a characteristic of the input speech utterance, including at least one characteristic of a group of characteristics, the group of characteristics including: an intonation, a speed of speech, one or more detected emotions, and a respective duration of each individual word of the input speech utterance.

17. A vehicle having a non-transitory computer-readable medium having stored thereon computer-executable instructions, which, when executed by at least one processor, cause the at least one processor to provide voice communication between a speaker and a recipient over a communication network by performing operations comprising:

receiving an input speech utterance from the speaker;

evaluating a bandwidth of a connection to the communication network at the side of the speaker;

converting the input speech utterance to text and deriving one or more tags representing one or more characteristics of the input speech utterance, including at least one of intonation, speed of speech, detected emotion, and duration of individual words, if the bandwidth is insufficient for transporting voice signals;

transmitting at least the text and the one or more tags over the communication network and, if the connection has a sufficient bandwidth, transmitting the input speech utterance as voice in addition to the text and tags;

converting the transmitted text using the one or more tags into an output speech utterance that simulates a voice of the speaker;

providing the output speech utterance to the recipient;

wherein the transmitted text is converted into the output speech utterance by one or more trained artificial intelligence models; and wherein a first trained artificial intelligence model transforms the transmitted text into an intermediate speech utterance in a speaker-independent latent feature space and a second trained artificial intelligence model trained using voice data of the speaker and operating in the same latent feature space transforms the intermediate speech utterance into the output speech utterance.

18. The vehicle according to claim 17, wherein the input speech utterance is transmitted as voice and as text if the connection has a sufficient bandwidth.

19. The vehicle according to claim 18, wherein the transmitted text is converted into the output speech utterance by a text-to-speech algorithm.

20. The vehicle according to claim 19, wherein the text-to-speech algorithm uses a phoneme library suitable for simulating different speakers.

21. The vehicle according to claim 17, wherein the second trained artificial intelligence model is selected from a bank of trained artificial intelligence models.

22. The vehicle according to claim 21, wherein the second trained artificial intelligence model is selected from the bank of trained artificial intelligence models based on information about the speaker.

23. The vehicle according to claim 22, wherein the information about the speaker is provided by the speaker or determined by a voice analysis algorithm.

24. The vehicle according to claim 23, wherein a third artificial intelligence model synthesizes an emotion of the speaker based on tags that are received along with the transmitted text, wherein the tags specify a characteristic of the input speech utterance, including at least one characteristic of a group of characteristics, the group of characteristics including: an intonation, a speed of speech, one or more detected emotions, and a respective duration of each individual word of the input speech utterance.

* * * * *